Feb. 19, 1957  J. R. DAVIS, JR  2,782,088
SUNLIGHT DURATION RECORDER
Filed June 30, 1953
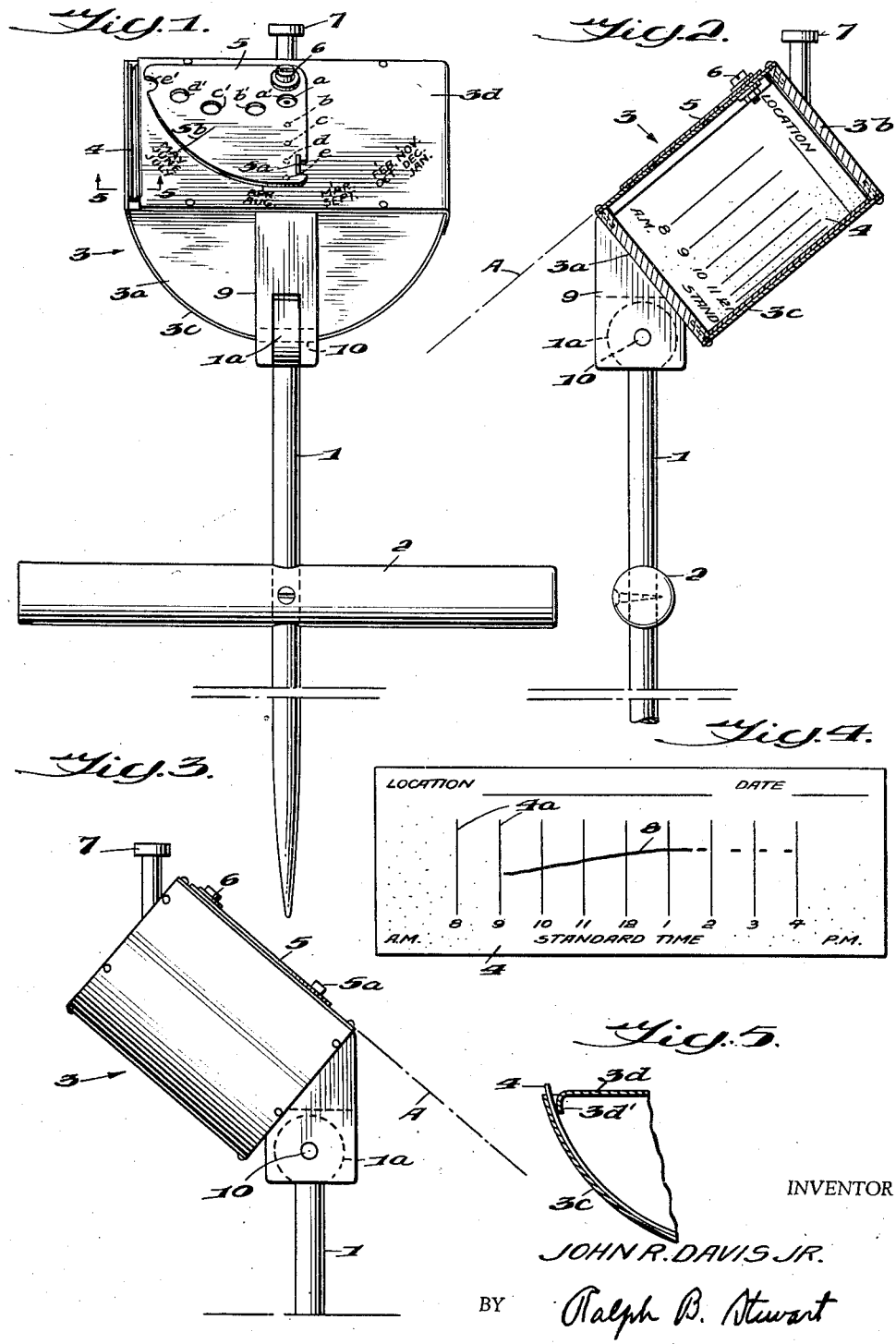
INVENTOR
JOHN R. DAVIS JR.
BY *Ralph B. Stewart*
ATTORNEY

United States Patent Office 2,782,088
Patented Feb. 19, 1957

2,782,088

SUNLIGHT DURATION RECORDER

John R. Davis, Jr., Fairland, Md.

Application June 30, 1953, Serial No. 364,992

3 Claims. (Cl. 346—107)

This invention relates to a device for recording the duration of sunlight falling upon a given location within a given time.

An object of the invention is to devise a simple instrument for providing a permanent record of the time during which the sun shines on a selected spot of ground during the day.

Another object is to provide an adjustment in the instrument to compensate for changes in the vertical angle of the sun's rays at different seasons of the year.

Still another object is to provide an adjustment in the instrument whereby it may be used in different locations of different latitudes.

While my invention may be useful in other activities, it is especially useful in connection with gardening. It is known that plants have very definite light requirements. Some, for example, must be shaded during the middle of the day. Others require "morning sun." Each has a minimum light requirement for flowering or bearing fruit. By using my recorder, a gardener can, without guesswork, find the spot in his partly shaded yard where he will have the best sunlight conditions for his favorite vegetable or flower. He may also determine, for a particular spot, which, if any, plants may be expected to thrive under the available sunlight.

Briefly, my sunlight recorder comprises a device constructed somewhat like a pinhole camera for making a trace line record of the sunlight upon a record blank formed of photographic paper, such as ordinary blueprint paper. For convenience in using the recorder at different locations, the camera is mounted upon a vertical standard, preferably in the form of a sharpened stake which may be driven into the ground at any desired location.

One simple form of my invention is illustrated in the accompanying drawing in which—

Figure 1 is a front elevational view of the recorder;

Figure 2 is a side view of Figure 1 with the camera part thereof shown in section;

Figure 3 is a side view of Figure 1 as seen from the opposite side thereof with respect to Figure 2;

Figure 4 shows a record blank with a typical sunlight trace recorded thereon; and Figure 5 is a sectional view of a fragmentary part of Figure 1 taken along the line 5—5.

Referring to the drawing, 1 indicates the vertical standard for supporting the recording camera. The standard is in the form of a sharpened stake having a double-ended handle 2 attached to the upper end thereof, and by which the stake may be driven into the ground by pressing down upon the handle with both hands.

The camera part of the recorder indicated generally at 3 is mounted upon the upper end of standard 1 and is formed of a semi-cylindrical box or casing having two semi-circular end walls 3a and 3b joined by a semi-cylindrical wall 3c and a flat face wall 3d. The wall 3d is turned inwardly at one end thereof, as shown at 3d' in Figure 5, to provide a slit-like opening between the inturned end of the wall and the adjacent end portion of the semi-cylindrical wall 3c. This slit is provided for the purpose of introducing into the camera a record blank 4 formed of photographic paper, such as ordinary blueprint paper. As shown in Figure 5, the blank 4 is supported in contact with the semi-cylindrical wall 3c and presents a semi-cylindrical light sensitive surface concentric with the axis A of the semi-cylindrical camera casing.

The face wall 3d is provided with a series of pinhole apertures a, b, c, d and e formed therein at the center thereof and spaced apart along the axis A of the semi-cylindrical surface. A shutter 5 provided with a series of apertures a', b', c', d', and e' is mounted upon face plate 3d to obscure all of the pinhole apertures in the face plate except one. The shutter 5 is pivoted to the plate 3d by screw 6, and the apertures a', b', etc., are located at different angular positions about the screw 6, and at the same distances from the axis of screw 6 as the apertures a, b, c, etc., so that any desired pinhole aperture may be exposed by moving the shutter 5 to different angular positions by means of the upturned ear 5a on the shutter. The shutter 5 carries an index mark 5b adjacent its edge and in a position to be aligned with one of a number of seasonal index marks carried on the face of plate 3d and marked according to the different seasons of the year when the vertical angle of the sun rays is approximately the same. For example, one index mark may be used for the months of May, June and July, a second for the months of April and August, a third for March and September, a fourth for February and October, and a fifth for November, December and January. These seasonal index marks are located in proper positions to expose the proper pinhole aperture so that the trace line remains approximately at the center of the record blank.

A suitable form of record blank is shown in Figure 4. These blanks may be printed to provide equally spaced parallel lines 4a arranged transversely of the length of the blank and marked according to the different hours of the day when the sun would be shining. For example, the blank shown in Figure 4 is provided with nine transverse lines marked according to the hours between 8:00 o'clock in the morning and 4:00 o'clock in the afternoon. Also, the blank is provided with a marked space for writing in the location at which the record was made and another marked space for writing in the date on which the record was made.

In using the recorder, the stake 1 is driven into the ground at the desired location and the camera is rotated or oriented until the axis A is arranged parallel with the axis of rotation of the earth. The axis A should be located in a vertical plane arranged in a north-south direction, and to assist in adjusting the camera in the proper direction, a small magnetic compass 7 is mounted upon the camera as shown, but this compass could be mounted directly upon the standard 1 instead of upon the camera box.

The angle at which axis A is inclined to the vertical axis of standard 1 will vary with the latitude of the observation point, but will remain fixed for any given locality. The camera box may be mounted upon the standard initially at the correct angle for a specified latitude, or the box may be mounted for adjustment about a horizontal axis to suit any latitude. For example, the box may be mounted on the standard by a pivoted joint, such as that shown in the drawing where the standard 1 is provided with an enlarged head 1a located in a slot formed in a block 9 secured to the camera box, and a pin 10 pivotally connects the head 1a to the block 9 on a horizontal axis. A suitable latitude scale may be attached to the box for cooperation with an index carried by the standard.

With the camera properly oriented, the shutter 5 is moved until the index 5b is positioned opposite the seasonal index mark corresponding to the month in which the record is being made. For example, the setting of the shutter 5 as shown in Figure 1 is correct for recordings made in May, June and July. The rays from the sun passing through the pinhole (*a*) form a small spot image of the sun upon the photo-sensitive surface of the record blank 4, and, as the earth rotates during the day, this image travels over the surface of the record blank 4 to form a trace line, one example being shown at 8 in Figure 4. At the end of the recording operation, the record blank is removed and developed in the usual manner, and the trace 8 then becomes a permanent record of the sunlight received on the recording surface during the recording period. In the example shown in Figure 4 the sunlight falling on the spot of observation was continuous from 9:00 o'clock in the morning until about 1:30 o'clock in the afternoon, and following this the sunlight was interrupted a number of times. If the record was made on a clear day, the trace indicates the existence of objects, such as tree branches, which cut off the sunlight from the point of observation at different times in the afternoon. This record shows that the particular location under observation is satisfactory for morning sun but unsatisfactory for afternoon sun.

While I have shown the use of a pinhole aperture for forming an image of the sun on the record blank, a lens type of aperture may be used if desired.

It is preferred that the camera box be formed so that the axis A is located within the plane of the face plate 3*d*, or very close to the plane of this plate or wall. It will also be noted that the record strip is supported along the arc of a circle having its center located on the axis A.

In the appended claims, the term "strip of photographic material" applies either to photographic paper or to photographic film.

I claim:

1. A sunlight duration recorder comprising a semi-cylindrical casing formed of opaque material and comprising two semi-circular walls joined along their curved edges by a semi-cylindrical wall, and a flat face wall extending between the straight edges of said semi-circular walls, the axis of said semi-cylindrical wall being located substantially in the plane of said face wall, one end of said face wall being joined with one straight edge of said semi-cylindrical wall, and the other end of said face wall having an end portion turned back into said casing in spaced parallel relation with the adjacent end portion of said semi-cylindrical wall, thereby providing a narrow slit in said casing for introducing a strip of photographic material within said casing in contact with said semi-cylindrical wall, and said flat face wall having a plurality of light-receiving apertures spaced along said axis, and including a movable shutter for selectively exposing one of said apertures while obscuring the remaining apertures.

2. A photographic recorder comprising a semi-cylindrical casing including a semi-cylindrical wall and a flat face wall extending between the straight edges of said semi-cylindrical wall, the axis of said semi-cylindrical wall being located substantially in the plane of said face wall, said casing having a narrow slit formed therein at the junction of said face wall and one straight edge of said semi-cylindrical wall for introducing a strip of photographic material within said casing in contact with said semi-cylindrical wall, said flat face wall having a plurality of light-receiving apertures formed therein and spaced along said axis at different distances from a given point thereon, and a shutter plate pivoted for movement over said face wall on an axis passing through said given point and having apertures formed therein at different distances from said point, and at different angles about said point, for exposing any selected one of said light-receiving apertures while obscuring the remaining light-receiving apertures.

3. A photographic recorder according to claim 2, wherein said shutter plate has an index mark thereon at its outer edge, and said face wall carries markings opposite the various positions of said index mark, when said shutter plate is set to different operative positions, for indicating various months of the year in which the different settings apply.

References Cited in the file of this patent

UNITED STATES PATENTS

| | | |
|---|---|---|
| 59,917 | Masters | Nov. 20, 1866 |
| 562,834 | Knausse et al. | June 30, 1896 |
| 2,551,597 | Hall | May 8, 1951 |

FOREIGN PATENTS

| | | |
|---|---|---|
| 852,941 | Germany | Oct. 20, 1952 |